United States Patent

[11] 3,554,188

| [72] | Inventors | Frank J. Lasch<br>Chicago;<br>Andrew M. Stemple, Morton Grove, Ill. |
|---|---|---|
| [21] | Appl. No. | 802,809 |
| [22] | Filed | Feb. 27, 1969 |
| [45] | Patented | Jan. 12, 1971 |
| [73] | Assignee | Zenith Radio Corporation<br>Chicago, Ill.<br>a corporation of Delaware |

[54] HEARTBEAT FREQUENCY MONITOR
3 Claims, 1 Drawing Fig.

[52] U.S. Cl............................................... 128/2.06,
304/265
[51] Int. Cl................................................... A61b 5/04
[50] Field of Search..........................................128/2.05PT,
2.06RATG; 331/713; 328/206, 111,
58; 307/234, 265

[56] References Cited
UNITED STATES PATENTS
| 2,492,617 | 12/1949 | Boland et al.................. | 128/2.06 |
| 3,201,602 | 8/1965 | Norwalt....................... | 307/265X |
| 3,214,602 | 10/1965 | Heyning et al............... | 307/265 |

OTHER REFERENCES
Boyd et al. " Electronic Engineering," August, 1954, pp. 330— 334 (128— 2.05T)

Primary Examiner—William E. Kamm
Attorney—John J. Pederson

ABSTRACT: There is described a diagnostic system for measuring the frequency of a patient's heartbeat which automatically protects against erroneous low readings resulting from abnormally high heartbeat frequencies. An input transducer monitors the patient's electrocardiac signal and develops an amplified electrical signal representative thereof. A monostable multivibrator is responsive to this amplified signal to produce an output signal consisting of a series of pulses having a uniform amplitude and width and having a repetition rate representative of the heartbeat frequency. The pulse series is converted into a DC voltage, proportional to the repetition rate, by a frequency-to-voltage converter. A readout device in the form of a voltmeter is responsive to the DC voltage to provide a visual indication of the patient's heartbeat frequency. The output signal of the multivibrator is subject to erroneous low values resulting from abnormally high heartbeat frequencies having periods shorter than the pulse width of the multivibrator. To overcome this deficiency, an additional amplifier circuit is employed which is responsive to the repetition rate of the multivibrator output signal for effecting variations in the multivibrator timing circuit to maintain its pulse width shorter than the heartbeat period regardless of variations in the patient's heartbeat frequency. This prevents the erroneous low values in the multivibrator output signal and thereby precludes erroneous heartbeat frequency readings resulting therefrom.

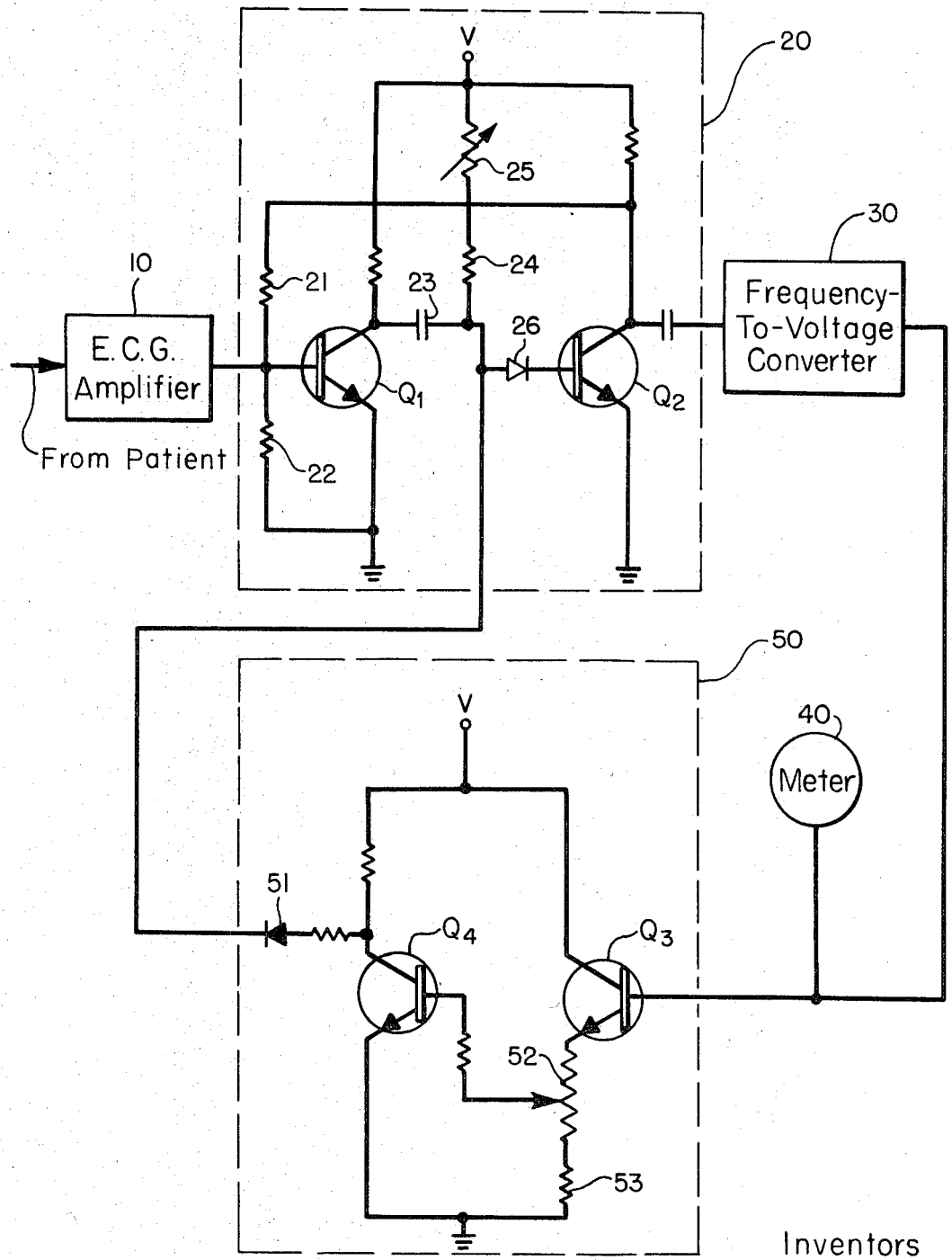

HEARTBEAT FREQUENCY MONITOR

BACKGROUND OF THE INVENTION

There are many situations where it is desirable or even necessary to be able to accurately determine the frequency of a patient's heartbeat. For medical diagnostic purposes, the heartbeat frequency is used as a source of data to at least partially indicate the condition of certain physiological processes of the human body. Such data is of particular importance during a surgical operation when it is necessary to readily obtain accurate and continuous information concerning the condition of the patient's body and the operation's effect thereon.

Various conventional electronic devices have been used to monitor a patient's heartbeat. As is well known, there are electrical signals that circulate upon the surface of a person's skin as a result of the expansions and contractions of the cardiac muscle (heart). Consequently, the waveshapes of these electrocardiac signals represent the action of the cardiac muscle and therefore may be used as a source of input information for an electronic heartbeat monitoring device. By placing electrodes on the patient's skin, these signals may be monitored and displayed (e.g., a chart recording, oscilloscope trace, meter reading, etc.) in various forms by suitable electronic equipment. The readout is usually indicated in units of beats-per-minute (BPM). During a surgical operation, for example, the displayed cardiac information may be readily observed and interpreted by the performing surgeon or one of his trained assistants. Should a malfunction in the action of the heart occur, it may be immediately determined from the displayed cardiac signal and appropriate corrective measures may be taken accordingly. Hence, such devices substantially reduce the risk of an operation to the patient in terms of detrimental physiological after-effects resulting from a cardiac malfunction not being immediately determined and corrected (e.g., brain damage resulting from a lack of oxygen due to inadequate blood circulation) and may even save a patient's life.

It is quite obvious that the usefulness of such a device is primarily dependent upon its accuracy. For the surgical operation example, false high readings may produce unnecessary delays which increase the risk of an operation to the patient, not to mention the consequent decrease in reliance on the device by the observer which may increase the possibility of his disregarding a valid abnormal reading as being merely another false reading. Moreover, a false low reading may even go undetected when such a low reading is approximately equal to a normal heartbeat frequency reading.

The source of such inaccuracies is often the manner in which the monitoring device responds to the electrocardiac signal. To better understand the problems involved, one should note that the electrocardiac signal of a normal human heart essentially comprises two pulses, a primary pulse (called the R-wave) followed shortly thereafter in time by a secondary pulse of lesser amplitude (called the T-wave). For a typical, normally functioning human heart, the T-wave follows the R-wave by approximately 200 milliseconds and has an amplitude equal to about one-half that of the R-wave. Conventional monitoring devices employ counting circuits which are triggered by the R-wave. Since the electrocardiac signal as a whole is subject to variations in amplitude, a preset threshold triggering level for such a device may often be low enough to permit the T-wave to trigger the device. In such a situation, the conventional monitoring device counts two pulses per heartbeat and therefore gives a false high reading. Hence, various attempts have been made to enable such a device to distinguish the R-wave from the T-wave and thereby eliminate false high readings. To this end, a nonresponse or "dead" time is usually introduced immediately following the R-wave and is fashioned such that its duration is greater than 200 milliseconds but less than the heartbeat period in order to overlap the undesired T-wave but not the R-wave of the following heartbeat. Accordingly, the electronic counting circuit only responds to the R-wave portion of each heartbeat signal and thus provides an accurate count of the heartbeat frequency.

A typical frequency for a normal human heartbeat is approximately 60 BPM (period = 1 second). For an abnormally functioning heart, however, the heartbeat frequency may change radically from this value. During surgery, for example, the heartbeat frequency may increase to 150 BPM. Moreover, during a physical abnormality known as Bigeminy, the heartbeat frequency can double in less time than one heartbeat period. Thus, in the interval between two heartbeats, the heartbeat frequency may jump from 150 BPM to 300 BPM. At 300 BPM the heartbeat period is approximately 200 milliseconds. Thus a nonresponse-time system, as discussed above, would not respond to alternate R-wave pulses at frequencies of 300 BPM (and greater) because the period of the 300 BPM heartbeat is so short that a second R-wave pulse falls within the nonresponse or "dead" time associated with the first R-wave and thus is not counted. Moreover, since Bigeminy may occur within a single heartbeat period, the first 300 BPM pulse may occur within the "dead" time and not be counted. Since only every other pulse thereafter is counted, the readout of the device still indicates 150 BPM instead of the actual 300 BPM. More importantly, since the reading remains at 150 BPM in this situation both before and after Bigeminy, the device does not even indicate that there has been a change in the condition of the patient's heart.

Various schemes have been contrived to prevent such erroneous readings, however, they typically employ elaborate, sophisticated electronic circuits which use digital circuit techniques to sample and compare consecutive heartbeat pulses, or perform similar operations to maintain accurate frequency readings. These are obviously quite expensive, complicated, and not always reliable.

It is therefore a primary object of the invention to provide a new and improved diagnostic device for accurately measuring the frequency of a patient's heartbeat.

It is a further object of the invention to provide such device which is less complicated, more reliable, and more economical than prior art devices.

SUMMARY OF THE INVENTION

In accordance with the invention, a diagnostic system for measuring the frequency of a patient's heartbeat, including means for protecting against erroneous low readings resulting from abnormally high heartbeat frequencies, comprises an input transducer for monitoring the patient's heartbeat and developing an electrical signal representative thereof. Generator means responsive to the electrical signal are provided for producing a series of pulses having a uniform amplitude and width, and having a repetition rate representative of the heartbeat frequency. Signal converter means responsive to the pulse series are provided for generating a control signal proportional to the repetition rate. The control signal is subject to erroneous low values resulting from abnormally high heartbeat frequencies having periods shorter than the pulse width. Also provided are output transducer means responsive to the control signal for providing an indication of the patient's heartbeat frequency, and means responsive to the control signal for effecting variations in the series pulse width to maintain the pulse width shorter than the heartbeat period regardless of variations in the patient's heartbeat frequency, in order to prevent the erroneous low values erroneous preclude erroneous heartbeat frequency readings resulting therefrom.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the single FIG. of which like reference numerals identify like elements, and in which the single FIG. is a schematic diagram of a preferred embodiment of the invention.

DESCRIPTION OF THE PREFERRED EMBODIMENT

Referring to the drawing, a preferred embodiment of an improved heartbeat frequency measuring device is shown using block diagrams and circuits outlined by dashed lines in order to present a brief overall understanding of the construction and operation of the invention, which includes an input transducer 10, in the form of an electrocardiograph (ECG) amplifier, for monitoring the patient's heartbeat and developing an electrical signal representative thereof. The monitoring may take several forms inducing an acoustoelectric transducer such as a microphone responsive to the sound of the patient's heartbeat or, preferably, a device such as an ECG amplifier to pick up and amplify the electrocardiac signals which, as previously discussed, circulate on the surface of the patient's skin. Furthermore, instead of the ECG amplifier, the input transducer may be three copper electrodes, for example, which are simply connected to the patient's body (e.g., right arm, left arm, and left leg) to pick up the electrical signals which circulate upon the surface of the patient's skin as a result of the expansions and contractions of the cardiac muscle. Often, an ECG amplifier is employed in conjunction with a heartbeat frequency monitor, however, and in such a situation it is very convenient to use the electrocardiac signal developed therein as a source of electrocardiac signals for the monitoring device. The ECG amplifier 10 is coupled to the patient (not shown) and may be used to provide various other signals including a written record of the patient's electrocardiac signal.

Generator means 20, in the form of a monostable multivibrator comprising transistors $Q_1$ and $Q_2$, is responsive to the electrical output signal of input transducer 10 for producing a series of pulses having a uniform amplitude and width, and having a repetition rate representative of the heartbeat frequency. A frequency-to-voltage converter 30 is responsive to the pulse series from the multivibrator for generating a control signal comprising a DC voltage which is proportional to the repetition rate. An output transducer in the form of a voltmeter 40 is responsive to the magnitude of the DC voltage for providing a visual indication of the patient's heartbeat frequency.

In operation, a patient's electrocardiac signal is picked up and amplified by the ECG amplifier 10 and applied to the monostable multivibrator 20. The values of bias resistors 21 and 22 determine the threshold triggering level of the multivibrator and are chosen such that, for each R-wave portion of the heartbeat signal, the multivibrator is triggered "on." Diode 26 performs a "steering" function; that is, it prevents negative signals from being applied to the base of transistor $Q_2$. By its very nature, the multivibrator remains triggered "on" for a predetermined length of time as determined in a conventional manner by the values selected for the timing network portion of the multivibrator comprising a capacitor 23, a resistor 24, and a variable resistor 25. Variable resistor 25 is included to provide a manual adjustment for the length of time the multivibrator is turned "on." Thus, a nonresponse or "dead" time is provided during which any subsequent input pulses (e.g., the T-wave portion of the heartbeat signal) cannot trigger the multivibrator and which is short enough to permit the counting of the R-wave pulse of the following heartbeat. Consequently, the repetition rate of the multivibrator is not affected by the T-wave. The repetition rate is detected by the converter 30 wherein it is transformed into a control signal in the form of a DC voltage, for example, which is applied to voltmeter 40. The meter provides a visual indication of the heartbeat frequency in response to the voltage applied to it.

The cardiac signal, as mentioned previously, comprises essentially two pulses, a primary or R-wave pulse followed shortly thereafter by a secondary or T-wave pulse. For a normal heart, the frequency is approximately 60 BPM and the time lag of the T-wave behind the R-wave is approximately 200 milliseconds. As the heartbeat frequency increases, the heartbeat period correspondingly decreases. In an abnormal condition, when the heartbeat frequency is 300 BPM, its period (the time between two consecutive R-waves) is 200 milliseconds. Consequently, for this frequency (and, of course, those frequencies greater than 300 BPM), consecutive R-wave pulses occur at the same time as (or more often than) a normal-frequency T-wave; thus, such R-waves are discriminated against by the nonresponse time of multivibrator 20 in the same way that a T-wave is discriminated against. As a result, the monitoring device, which is entirely conventional as thus far described, does not count alternate R-waves and therefore has a readout indicating one-half the actual heartbeat frequency for frequencies of 300 BPM or greater.

In accordance with the invention, a circuit means 50 is provided which is responsive to the control signal for effecting variations in the multivibrator pulse width (i.e., "dead" time) in order to maintain the duration of the "dead" time shorter than the heartbeat period regardless of variations in the patient's heartbeat frequency. This prevents the erroneous low values in the repetition rate and thereby precludes erroneous heartbeat readings resulting therefrom. This is accomplished in such a manner so as to maintain the aforementioned discrimination of the T-wave in order to prevent false high readings yet still enable the counting of all R-waves. The time lag of the T-wave relative to the R-wave is usually directly proportional to the heartbeat period; hence, the amount of shortening of the "dead" time is selected such that it is shorter than the heartbeat period yet longer than the T-wave time lag.

Circuit means 50 comprises two amplifier stages including transistors $Q_3$ and $Q_4$. The amplifier stage comprising $Q_3$ provides both circuit isolation and a threshold detector. Although not essential, the threshold feature slightly modifies the basic idea of effecting variation in the multivibrator pulse width inasmuch as it establishes a predetermined heartbeat frequency at which the variation of the nonresponse time begins. In this embodiment, therefore, the circuit 50 does not respond to the voltage from converter 30 until this voltage reaches a predetermined threshold. For example, the threshold may be selected to correspond to a heartbeat frequency of 150 BPM to thereby preclude the possibility of the aforesaid Bigeminy situation going undetected. The amplifier stage comprising $Q_4$ provides an additional amount of amplification and proper signal polarity. Diode 51 is included to protect transistor $Q_4$ from any spurious negative pulse that may be produced by the rapid charging of capacitor 23 when the multivibrator is turned "on."

The operation of the illustrated heartbeat monitoring device, in accordance with the invention, is therefore such that, as the patient's heartbeat frequency increases, the voltage from converter 30 correspondingly increases and is simultaneously applied to meter 40 and to the base of transistor $Q_3$ of circuit 50. When this voltage attains a predetermined threshold level, as determined by the setting of variable resistor 52 and the value of resistor 53, $Q_3$ detects the voltage and applies a DC signal to the base of transistor $Q_4$. Transistor $Q_4$ amplifies the signal, reverses its polarity, and, by means of diodes 51 and 26, applies a bias signal to the base of multivibrator transistor $Q_2$ to effectively shorten the time constant of the monostable multivibrator and thereby shorten the width of its pulse. As the width of the pulse is decreased, the amount of "dead" time is decreased; hence, the maximum frequency to which the device accurately responds is correspondingly increased. As a result, the circuit 50 ensures that the monostable multivibrator responds to each R-wave, and only each R-wave, and thereby provides protection against erroneous low readings.

Thus the invention provides a new and improved diagnostic device for measuring the frequency of a patient's heartbeat which is simple to operate, economically constructed, and quite reliable. By effectively shortening the nonresponse time of the device's triggering network with increasing heartbeat frequencies such that said time is shorter than the heartbeat period yet longer than the time the T-wave lags the R-wave, false high and low frequency readings are prevented.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A diagnostic system for measuring the frequency of a patient's heartbeat, including means for protecting against erroneous low readings resulting from abnormally high heartbeat frequencies, comprising:

an input transducer for monitoring the patient's heartbeat and developing an electrical signal representative thereof;

generator means responsive to said electrical signal for producing a series of pulses having a uniform amplitude and width, and having a repetition rate representative of said heartbeat frequency;

signal converter means responsive to said pulse series for generating a control signal proportional to said repetition rate, said control signal being subject to erroneous low values resulting from abnormally high heartbeat frequencies having periods shorter than said pulse width;

output transducer means responsive to said control signal for providing an indication of the patient's heartbeat frequency; and means responsive to said control signal for effecting variations in said pulse width to maintain said pulse width shorter than said heartbeat period regardless of variations in the patient's heartbeat frequency, in order to prevent said erroneous low values and preclude erroneous heartbeat frequency readings resulting therefrom.

2. A diagnostic system according to claim 1, in which said generator means comprises a monostable multivibrator having a timing network for determining the length of time that said multivibrator is turned on, and responsive to said control signal for effecting variations in said length of time.

3. A diagnostic system according to claim 1, in which said pulse width variation means includes a threshold detector effective only when said control signal attains or exceeds a predetermined threshold level.